US005591294A

United States Patent [19]

Sakaki et al.

[11] Patent Number: 5,591,294

[45] Date of Patent: Jan. 7, 1997

[54] RECORDING SHEET MANUFACTURING AND STORING METHOD, RECORDING SHEET OBTAINED BY THE METHOD, AND INK JET RECORDING METHOD USING THE RECORDING SHEET

[75] Inventors: Mamoru Sakaki, Yamato; Miyuki Fujita, Tokyo; Yasuyuki Ishii, Kawasaki, all of Japan

[73] Assignee: Canon Kabushiki Kaisha, Tokyo, Japan

[21] Appl. No.: 274,028

[22] Filed: Jul. 12, 1994

[30] Foreign Application Priority Data

Jul. 16, 1993 [JP] Japan .................................... 5-176776

[51] Int. Cl.⁶ ............................ B32B 31/18; B32B 31/22

[52] U.S. Cl. .......................... 156/250; 53/111 R; 53/235; 53/285; 53/467; 156/235; 427/146; 427/377

[58] Field of Search .................................... 156/235, 250; 53/111 R, 285, 235, 467; 427/146, 377

[56] References Cited

U.S. PATENT DOCUMENTS

| | | | |
|---|---|---|---|
| 4,733,247 | 3/1988 | Arai et al. | 346/135.1 |
| 5,204,211 | 4/1993 | Horie et al. | 428/232 |

FOREIGN PATENT DOCUMENTS

| | | | |
|---|---|---|---|
| 0380133 | 8/1990 | European Pat. Off. | 428/195 |
| 0387893 | 9/1990 | European Pat. Off. | 428/195 |
| 0452102 | 10/1991 | European Pat. Off. | 428/195 |
| 0495430 | 7/1992 | European Pat. Off. | 428/195 |
| 54-059936 | 5/1979 | Japan | 428/195 |
| 60-220750 | 11/1985 | Japan | 428/195 |
| 03025352 | 4/1991 | Japan | 428/195 |
| 03026665 | 4/1991 | Japan | 428/195 |

*Primary Examiner*—Pamela R. Schwartz
*Attorney, Agent, or Firm*—Fitzpatrick, Cella, Harper & Scinto

[57] ABSTRACT

In a method of manufacturing and storing a recording sheet, a coating solution is coated on at least one surface of a base member and dried and a resulting recording sheet is cut and enclosed in a packaging material. The process from drying to enclosing is carried out in an atmosphere having a humidity not exceeding 50% RH.

14 Claims, 4 Drawing Sheets

RECORDING SHEET MANUFACTURING AND STORING METHOD, RECORDING SHEET OBTAINED BY THE METHOD, AND INK JET RECORDING METHOD USING THE RECORDING SHEET

BACKGROUND OF THE INVENTION

1. Field of the Invention

The present invention relates to a recording sheet suitably used in ink jet recording, a method of manufacturing and storing the recording sheet, and an ink jet recording method using the recording sheet.

2. Related Art

A recording medium conventionally used in ink jet recording includes a recording paper composed of a base layer having a coated layer formed thereon which contains fine powder silica and a water-soluble binder such as polyvinyl alcohol as disclosed in Japanese Patent Examined Publication No. Hei 3-26665, a glossy paper composed of a cast coated paper having a film formed thereon which contains polyvinyl alcohol having a degree of saponification of 50–90 mol % and a bridging agent as disclosed in Japanese Patent Examined Publication No. Hei 3-25352, and further a recording sheet for use with an overhead projector (OHP) composed of a polyester film having a hydrophilic film composed of water-soluble polyvinyl alcohol having a degree of saponification of 70–90 mol % as disclosed in Japanese Patent Unexamined Publication No. Sho 60-220750.

Recently, with the improvements in ink jet recording apparatuses such as an increase in recording speed, multicolor printing and the like, an ink jet recording medium is required to provide higher and wider characteristics. That is, the following characteristics are required to be simultaneously satisfied:

(1) higher ink absorbing capability (larger absorbing capacity and shorter absorbing time);

(2) capability of formed dots to have higher optical density and the periphery of the dots not to become obscure;

(3) capability of formed dots to have a shape approximating a perfect circle with a smooth periphery;

(4) capability of image characteristics to be less changed by temperature and humidity and prevention of curling due to such conditions;

(5) prevention of blocking; and (6) capability of an image to be stably retained for a long time without deteriorating quality (in particular, in the environment of high temperature and high humidity), and the like.

There is also a need for a recording sheet excellent in transparency such as a recording sheet for OHP and a recording paper having a surface glossiness.

As a recording speed is increased, an image has an increased density, and a ratio of images printed with colors is increased, a serious problem arises in that the quality of the image is lowered due to defective fixing of ink. More specifically, since a recording sheet has an insufficient ink absorbing capability, an image is made dirty and a thickness of ink is made uneven due to the flooding of ink at the portion of the recording sheet where the image has a high density, that is, where a large amount of ink is ejected. Further, in the case of color printing, colors are made dirty by the mixing of colors at the boundaries of different colors.

To cope with the above problems, there is conventionally employed a method of compensating an insufficient ink absorbing capability by increasing a thickness of a covering layer (ink receiving layer). In this case, however, there is a problem that a recording sheet is liable to be curled by the change of temperature and humidity. To restrict the occurrence of curling, conventionally, there is often employed such methods as to form the same covering layer on both surfaces of a base member and form a curling prevention layer on the surface of a recording sheet opposite to a recording surface.

As a recording speed is increased, a recording apparatus employing an ink jet recording system has been widely used which continuously carries out recording by using cut recording sheets loaded on a paper feed tray. A generally used example of this type of the recording apparatus comprises a paper feed tray on which cut recording sheets can be loaded and transportation means for separating one of the recording sheets loaded on the paper feed tray by contacting at least one surface of the recording sheet and transporting the separated recording sheet from the paper feed tray to a recording unit.

When the aforesaid recording apparatus is used, a recording sheet is further required to provide such a performance that the recording sheet does not move obliquely while it is being transported, the recording sheet is not jammed, and loaded recording sheets can be easily separated.

In particular, since the transparent recording sheet and the recording sheet having a glossy surface mentioned above must be provided with a covering layer as transparent as possible to restrict the dispersed reflection of light incident on a recording surface, it is difficult to obtain these recording sheet satisfying the above characteristics. Thus, it has not been examined to further provide these recording sheets with transporting characteristics in addition to the above characteristics.

SUMMARY OF THE INVENTION

An object of the present invention is to provide a recording sheet for simultaneously satisfying the aforesaid characteristics in good balance and an ink jet recording method using the recording sheet and further to provide a recording sheet suitable for continuous recording which can be carried out in any environmental conditions using the aforesaid recording apparatus and the like, a method of manufacturing the recording sheet, a method of storing the recording sheet and an ink jet recording method carried out using the recording sheet. Another object of the present invention is to provide a recording sheet suitable for forming a recorded image excellent in transparency and surface glossiness and a method of ink jet recording using the recording sheet.

These objects can be realized by the following aspects of the invention.

According to a first aspect of the present invention, a method of manufacturing and storing a recording sheet includes the steps of coating a coating solution on at least one surface of a base member, drying the coated coating solution to form a sheet member with a covering layer, cutting the sheet member into cut sheets having a desired size, and enclosing and sealing at least one of the cut sheets in a packaging material that is impermeable to moisture while the at least one of the cut sheets is maintained in a flat state, wherein at least the drying step, the cutting step, and the enclosing and sealing step are effected in an atmosphere in which humidity does not exceed 50% RH.

Further, the present invention relates to a recording sheet obtained according to the above manufacturing and storing method and to an ink jet recording method using the recording sheet, wherein at least one surface of the recording sheet has a surface electric resistance value in a range of $10^9$–$10^{11}$ Ω/cm$^2$, at least one surface of the recording sheet has a degree of surface flatness in a range of 5–250 seconds, if the base member is transparent a linear transmission factor of the recording sheet itself is 30% or higher, and if the base member is opaque at least one surface of the recording sheet has a specular glossiness at 60° of 30% or higher.

Further, the present invention relates to an ink jet recording method of carrying out recording to the recording sheet by ejecting an ink from an orifice of a recording head according to a recording signal, wherein a solvent of the ink is mainly composed of water and water-soluble glycols or glycol ethers, the ink jet recording method is a color ink jet recording method with the ink being a cyan ink, a magenta ink, a yellow ink and a black ink, and the ink is ejected by thermal energy acted thereto.

Further, the present invention relates to an ink jet recording method of carrying out recording using a recording apparatus having a paper feed tray on which cut recording sheets can be loaded and transportation means which separates one of the recording sheets by coming into contact with at least one surface of the recording sheets loaded on the paper feed tray and transports the separated recording sheet from the paper feed tray to a recording unit, wherein the covering layer of at least one surface of the recording sheet has a thickness greater than a maximum recording density of a mono-color ink of the recording apparatus, and recording is carried out by loading at least two or more of the recording sheets on the paper feed tray.

DETAILED DESCRIPTION OF THE PREFERRED EMBODIMENTS

In the process of developing a recording sheet suitable for ink jet printing, in particular, a recording sheet for OHP and a recording sheet having a highly glossy surface, it was discovered that a recording sheet manufactured and stored by the aforesaid method had not only an excellent ink absorbing capability, vivid and sharp dots and an excellent blocking resistant property, but also a performance which was less affected by the change of environmental conditions of temperature and humidity and that in particular continuous recording could be effected on the recording sheet by the same method as that applied to a conventional recording paper even if the recording sheet was used under any environmental conditions or exposed to such conditions which changed from high temperature and high humidity to low temperature and low humidity and could particularly cope with recording carried out at a high speed.

Since the transparent recording sheet and the recording sheet with a glossy surface restrict the dispersed reflection of light incident on a recording surface thereof, a covering layer as transparent as possible must be provided. Thus, these recording sheets have a problem in continuous recording in the following points when compared with a recording sheet having a porous structure such as a conventional coated paper and normal paper.

First, since a covering layer formed on a base member is a hydrophilic or water-soluble continuous film or a film having similar properties, the covering layer greatly expands or contracts in response to a humidity change. As a result, even if a covering layer having the same thickness and the same composition is formed on the both sides of the base member, a recording sheet having such covering layers is liable to be curled if even a slight unevenness (for example, when the recording sheet is put on a desk, only one surface thereof is humidified (or dehumidified)) is caused between the front surface of the recording sheet and the back surface thereof depending upon a situation in which the recording sheet exists.

Second, when the recording sheets are loaded on a paper feed tray, they are liable to be in intimate contact with each other and to be separated with difficulty.

The present invention is particularly effective also with regard to the aforesaid transparent recording sheet and the recording sheet with a glossy surface.

The present invention will be described in specific detail with reference to embodiments.

Figure 5:
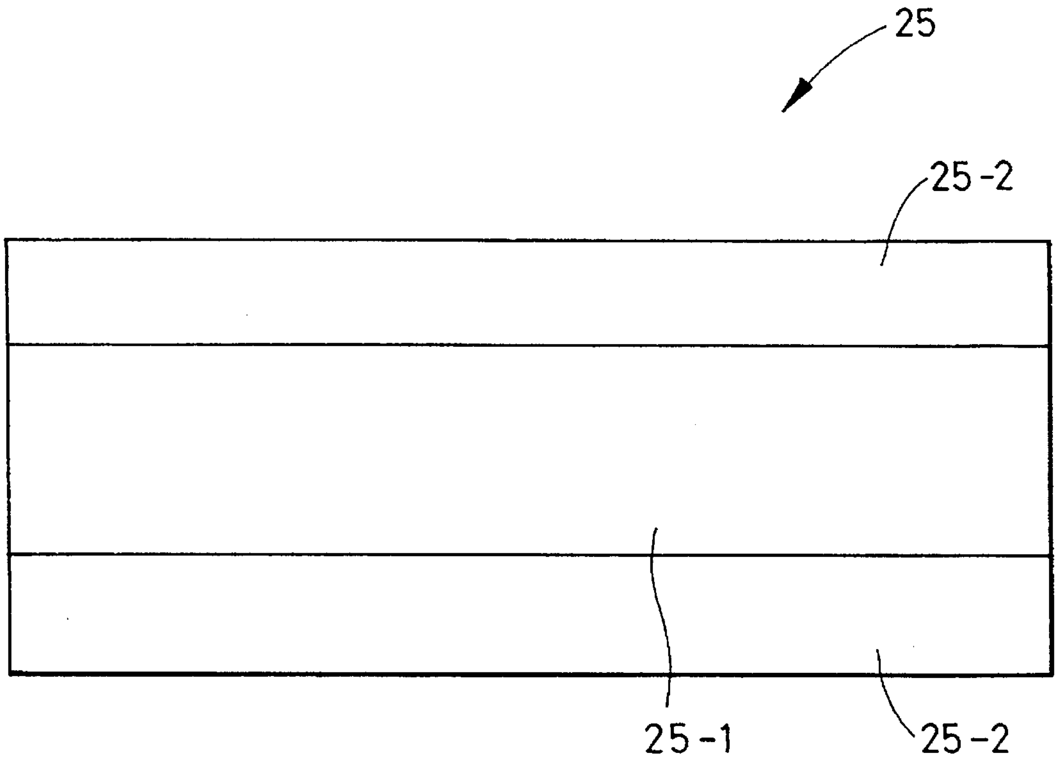
FIG. 5 is a cross-sectional view of an embodiment of a recording sheet according to the present invention.

A first feature of the present invention is a method of manufacturing and storing a recording sheet 25, a cross-section of an example of which is shown in FIG. 5. When a recording sheet is to be manufactured, a composition for forming a covering layer is dissolved in or dispersed in water, alcohol or any other suitable organic solvent to prepare a coating solution. The obtained coating solution is coated on the surface of a base member 25-1 by, for example, a roll coater method, blade coater method, air knife coater method, gate roll coater method, bar coater method, size press method, spray coating method, gravure coater method, curtain coater method or the like. Thereafter, the coated solution is dried by, for example, a hot air drying furnace, a heat drum or the like so that a covering layer 25-2 is formed on the base member. The thus obtained recording sheet is cut into cut sheets having a desired size by a rotary cutter, a guillotine cutter or the like as necessary to form recording sheets. When the covering layer 25-2 is to be formed on both surfaces of the base member 25-1, the above process from coating to drying may be repeated to each surface using the same coating solution or a different coating solution, or the coating solution may be coated to the front surface and the back surface of the base member, respectively and then these surfaces may be simultaneously dried. After having been dried, the recording sheet may be subjected to a super calender processing and the like to flatten an ink receiving layer or increase a surface strength. The thus obtained cut recording sheets are enclosed in a packaging material containing a non-moisture permeable material while being kept in a flat state and in order to be stored in a sealed state.

According to the present invention, it is essential that the above process from at least drying to enclosing and sealing be carried out in an atmosphere where at least a relative humidity does not exceed 50% RH. More specifically, in the present invention, the recording sheets are not exposed to an atmosphere having a humidity exceeding 50% RH at least until the packaging material is opened again and kept in a flat state in which no curling is caused. When the recording sheets which have been stored while being exposed to the atmosphere having a humidity exceeding 50% RH and being kept in a flat state are put into the environment of low temperature and low humidity after the package thereof is opened, they are quickly contracted because the covering layer is dehumidified. Therefore, even a recording sheet having the same covering layer formed on the both surfaces thereof is liable to be curled because of the reason mentioned above. When recording is carried out using a curled recording sheet such as, for example, a curled cut recording sheet by the aforesaid recording apparatus capable of carrying out continuous recording, a portion of the curled sheet comes into contact with a portion of the recording apparatus while the recording sheet is being transported from a paper feed tray of the recording apparatus to a recording unit, by which a jam and oblique movement of the recording sheet may result. Further, the recording sheet may not even be able to be loaded on the paper feed tray or even if the recording sheet is safely transported to the recording unit, a curled end of the sheet may about against a recording head while ink jet recording is being carried out and the recording head may be damaged by such contact. When stored, particularly in the case of recording sheets having a covering layer formed on both surfaces thereof, blocking may be caused between the recording sheets depending upon the quality of the sheets, or the sheets come into intimate contact with each other by static electrification due to friction, or when the sheets are used to continuous recording, problems may arise in the separating property of the respective sheets.

The recording sheet of the present invention expands by absorbing moisture through its covering layer when the recording sheet is put in an environment of high temperature and high humidity after its package is opened, as compared with a recording sheet manufactured in the environment of normal temperature and normal humidity (for example, 60–70% RH). In this case, however, the recording sheet of the present invention rarely curls because the internal stress is relatively small, and such a recording sheet rather tends to be stabilized and flattened as it absorbs moisture.

Therefore, according to the present invention, when the recording sheet is to be manufactured, a specific environment of humidity must be set as well as at least a portion of a packaging material must be impermeable to moisture to prevent the recording sheet from absorbing moisture after its package is opened. A non-moisture permeable material used in this invention preferably has a vapor transmittance of $1\times10^5$ ($cm^3$.cm/sec.$cm^2$.ppa) or less at 25° C. Such a material is preferably a composite plastic sheet containing a thin metal film. In particular, as a moisture proof material for the present invention, there are well known in other fields a composite plastic sheet containing a thin aluminium film and one or two laminated layers of polyethylene terephthalate, polyethylene, polypropylene, polyvinyl chloride, polystyrene, polyacrylonitrile, polycarbonate, polyimide, etc., each vapor deposited with aluminium or laminated with a thin aluminium film.

As described above, although an environmental humidity at which the recording sheet is manufactured and packaged prior to storing is preferably as low as possible because curling is less in such an environment, a lower limit of the environmental humidity is preferably 20% RH or higher. When a humidity is lower than the above range, the sheet may be charged with static electricity by friction depending upon its material while stored. Thus, when the sheet is used for continuous recording, a problem may arise in the separation of each sheet.

In the present invention, although an environmental temperature at which the recording sheet is manufactured and packaged does not greatly affect the characteristics of a film, it is preferably in the range of 10° C. –30° C.

As a base member constituting the recording sheet of the present invention, there can be used paper such as wood free paper, medium-class paper, art paper, bond paper, recycled paper, baryta paper, cast coat paper, corrugated fiberboard, etc.; a film or plate composed of polyethylene terephthalate, diacetate, triacetate, cellophane, celluloid, polycarbonate, polyimide, polyvinyl chloride, polyvinylidene chloride, polyacrylate, polyethylene, polypropylene, etc.; a glass plate; and a cloth formed of cotton, rayon, acryl, nylon, silk, polyester, etc. The base member is suitably selected from the above materials in accordance with various conditions such as a recording object of the recording sheet, application of recorded images, intimate contact property of the base member with a composition covering the upper surface thereof and the like. When a transparent recording sheet or a recording sheet having a glossy surface is to be formed, a plastic film is preferably used.

The recording sheet of the present invention comprises a base member having a covering layer formed on at least one surface thereof and preferably a base member having covering layers formed on the both surfaces thereof. At least one covering layer is a layer having an ink receiving property to which water-based ink can be fixed. These layers can be formed using various binders, fillers and additives together. The binder includes, for example, conventionally known starch, cationated starch, casein, gelatin, acrylic resin, maleic anhydride resin, melamine resin, urea resin, SBR latex, sodium alginate, polyvinyl pyrrolidone, carboxymethyl cellulose, hydroxyethyl cellulose, polyvinyl alcohol, polyethylene oxide, etc., but it is not limited thereto. The filler includes, for example, inorganic pigments such as silica, alumina, aluminium silicate, magnesium silicate, basic magnesium carbonate, chalk, clay, hydrotalcite, calcium carbonate, titanium oxide, zinc oxide, etc.; and plastic pigments such as polyethylene, polystyrene, polyacrylate, etc., but it is not limited thereto. The additive includes, for example, various surfactants, dye-fixing agents (anti-hydration agents), defoaming agents, antioxidants, fluorecent brighteners, UV absorbents, dispersion agents, viscosity adjusters, PH adjusters, anti-mold agents, and plasticizers. These additives may be arbitrarily selected from conventionally known compounds.

When a transparent recording sheet and a recording sheet having a glossy surface are to be manufactured, the covering layer must be transparent. In this case, either a filler is not used, the filler is added in a range by which light transmittance or surface glossiness is not affected, or a filler composed of ultra-fine particles is used. Further, when the filler has a film forming capability, a binder need not be used.

Although the recording sheet of the present invention is formed in the aforesaid method, the present invention is more effective in an embodiment provided with a transparent covering layer as described above. In this case, when the base member is transparent, the recording sheet is formed as a transparent recording sheet and when the base member is not transparent, the recording sheet is formed as a recording sheet having a glossy surface.

The transparent recording sheet referred to here has a linear transmission factor of 30% or more, and the linear transmission factor (T%) is determined by measuring a spectral transmission factor of linear light by, for example, a Hitachi Self-recording Type Spectro-photometer Model 323 (manufactured by Hitachi Seisakusho). The linear light is vertically incident on a sample, passes through the sample and a light receiving slit located at a position apart from the sample at least 8 cm along a line extended from the incident path of the light, and is received by a sensor. Then a Y value of three stimulus values of color from the measured spectral transmission factor is determined. Then, the linear transmission factor is determined by the following equation:

$$T=(Y/Y0)\times 100$$

where

T is the linear transmission factor,

Y is the Y value of the sample, and

Y0 is the Y value of a blank.

The recording sheet having a glossy surface referred to here has at least one of surfaces whose specular glossiness at 60° is 30% or higher. The specular glossiness at 60° is a value measured based on JIS-Z-8741.

Although a range of preferable coating amount per unit surface area of the above covering layer differs depending upon a maximum recording density (or weight-per-area) of a recording apparatus, it is preferably at least a maximum recording density or higher of a mono-color ink used by a recording system. Usually, it is in a range of 2–30 g/m$^2$ as a total amount. When the amount of coating is small, a portion of the base member may be exposed to the surface of the covering layer. When the amount of coating is not greater than 2 g/m$^2$, a sufficient effect cannot be obtained with respect to a chromophoric property of a color material as compared with a case in which an ink receiving layer is not formed. Whereas, when the amount of coating exceeds 30 g/m$^2$, curling may be greatly caused in the environment of low temperature and low humidity even if the method of the present invention is used. When expressed by thickness, the amount of coating is preferably in a range of 8–50 μm thick.

A more preferable embodiment of the present invention is a recording sheet having at least one surface whose surface electric resistance is in a range of $10^9$–$10^{11}$ Ω/cm$^2$. A value of the surface electric resistance is adjusted while the aforesaid manufacturing method is carried out. For example, there are a method of adding an electrolyte such as sodium chloride, potassium chloride, etc. to a coating solution for forming the coating layer and a method of partially using, as the above binder, cationic resin such as, for example, a hydrophilic polymer containing primary amino group to ternary amino group or quarternary ammonium base in molecules. In particular, when a hydrophilic polymer containing quarternary ammonium base is used, an image can be stored in a very good state.

A value of the surface electric resistance referred to in the present invention is a value measured based on a method of JIS-C-2111. Since the surface electric resistance has a different value depending upon environmental conditions under which it is measured, in the present invention, it is obtained in such a manner that a recording sheet taken out from a package by opening a packaging material is left in the atmosphere of 20° C./50% RH for a day or longer and a surface electric resistance of the recording sheet is measured in the same environment. A value of the surface electric resistance can be measured by means of, for example, a High Resistance Meter (YHP 4329A) and a Resistivity Cell (YHP 1608A).

A polyester film which is, for example, suitably used as a base member of the recording sheet of the present invention has a value of the surface electric resistance of about $10^{15}$–$10^{16}$/cm$^2$ when measured by the above method, and the transparent recording sheet composed of the polyester film having a water-soluble resin film such as polyvinyl alcohol formed thereon which was described in the prior art has a value of the surface electric resistance in a range of $10^{12}$–$10^{14}$ Ω/cm$^2$. When a value of the surface electric resistance exceeds the preferable range of the present invention as described above, the loaded recording sheet of the present invention has a poor separating property caused by electrification due to friction. When such a the recording sheet is applied to continuous recording carried out by, for example, the aforesaid recording apparatus particularly in the environment of low temperature and low humidity, a jam is liable occur in the recording apparatus. Thus, a surface electric resistance of such a value is not preferable. When a value of the surface electric resistance is less than the preferable range, no disadvantage is directly caused. If a value of the surface electric resistance is excessively lowered, however, no noticeably improved effect can be obtained and on the contrary a secondary effect (deterioration of image quality, ink absorbing capability and transparency, and the like) tends to be caused by additives.

A more preferable embodiment of the present invention is a recording sheet at least one surface of which has a surface flatness in a range of 5–250 seconds. A value of the surface flatness is adjusted while the aforesaid manufacturing method is carried out. The surface flatness can be adjusted in a range not damaging the transparency of a covering layer by adjusting, for example, a particle size, a refraction ratio, a content and the like of the above filler.

The surface flatness referred to in the present invention is a value measured based on a method of JIS-P-8119.

The conventional recording sheet and recording sheet having a surface glossiness has a surface flatness of about 500–∞ seconds. When a range of the surface flatness exceeds the preferable range of the present invention, the recording sheets of the present invention, particularly those having a covering layer formed on the both surfaces thereof, are liable to cause blocking of each other when utilized in continuous recording using, for example, the aforesaid recording apparatus in the environment of high temperature and high humidity and the loaded recording sheets have a poor separating property and are liable to cause a jam in the recording apparatus. When a surface flatness is less than the above range, no noticeably improved effect can be obtained and on the contrary transparency and surface glossiness are lowered.

When ink jet recording is carried out on the recording sheet described above, any well-known ink can be used without causing any problem. Further, a water-soluble dye such as direct dye, acid dye, basic dye, reactive dye or food color can be used as a recording agent and dyes applicable to usual jet recording can be used without being particularly limited. This type of dye is usually used in conventional ink in a ratio of about 0.1–20 wt % and this ratio is also applicable to the present invention.

A solvent applied to water-based ink used in the present invention is water or a mixed solvent of water and a water-soluble organic solvent (glycols, glycol ethers). The mixed solvent of water and a water-soluble organic solvent is particularly preferably one which contains polyhydric alcohol as the water-soluble organic solvent for preventing the drying of ink.

A method of carrying out recording by applying the above ink to the above recording sheet is preferably an ink jet recording method and this method may be any method so long as it can effectively discharge ink from a nozzle and apply the ink to the recording sheet as a member to receive a discharged droplet of ink.

In particular, an ink jet system employing the method disclosed in Japanese Patent Unexamined Publication No. Sho 54-59936 can be effectively used to cause a rapid change of volume and state of ink which receives an action of thermal energy and to eject the ink from a nozzle by the working action caused by the state change.

Figure 1:
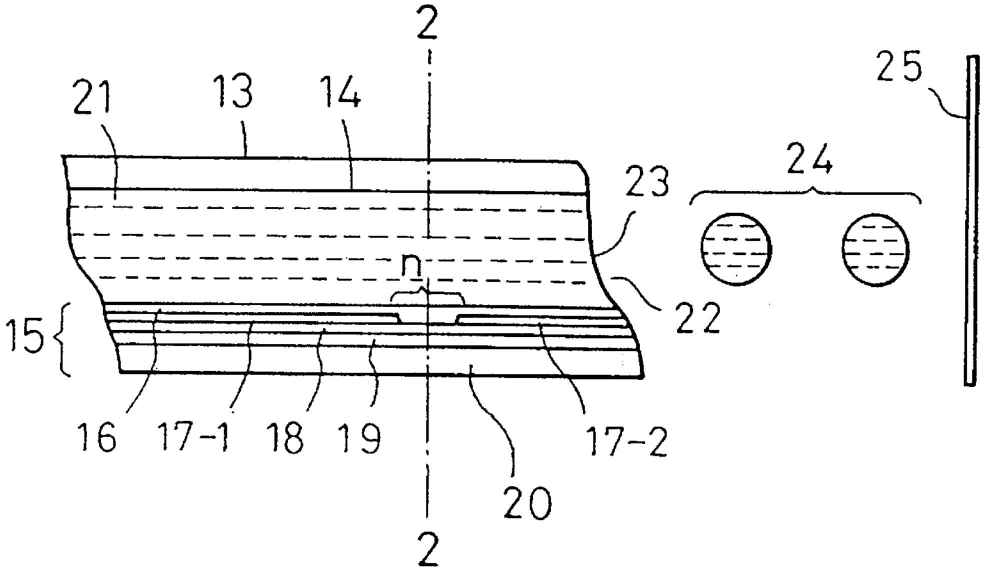
FIG. 1 is a longitudinal cross-sectional view of a head of an ink jet recording apparatus.
Figure 2:
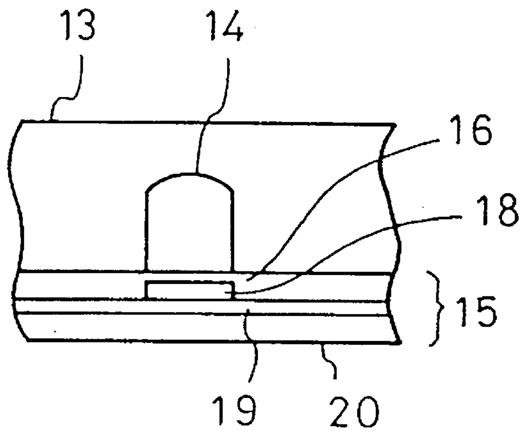
FIG. 2 is a horizontal cross-sectional view of the head of the ink jet recording apparatus.
Figure 3:
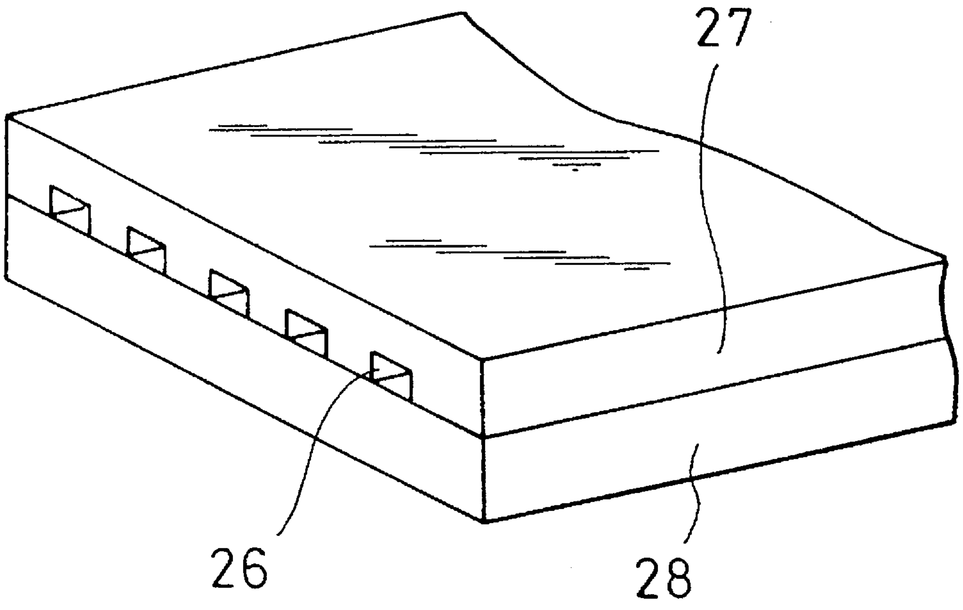
FIG. 3 is an outside perspective view of the head shown in FIG. 1 which is arranged as a multiple head.

An ink jet recording apparatus suitable for carrying out recording by using the recording sheet of the present invention will be described by way of example. FIGS. 1, 2 and 3 show an arrangement of a head as a main part of the apparatus.

A head unit 13 is obtained by bonding a glass plate, a ceramic plate, a plastic plate or the like each having a groove 14 through which ink passes to a heating base 15 used for heat sensitive recording. The heating base 15 comprises a protective film 16 composed of silicon oxide or the like, aluminium electrodes 17-1, 17-2, a resistance heat generating layer 18 composed of nichrom or the like, a heat accumulation layer 19, and a substrate 20 composed of alumina or the like and having an excellent radiating property.

Ink 21 is supplied to an ejection orifice (fine hole) 22 and forms a meniscus 23 by a pressure P.

When an electric signal is applied to the electrodes 17-1, 17-2, the heating base 15 is rapidly heated at the region thereof shown by n and a bubble is formed in the ink 21 in contact with the region n and ink near the meniscus 23 is ejected by the pressure of the bubble so that the ink 21 is ejected and flies from orifice 22 toward a recording sheet 25 as a recording droplet 24. FIG. 3 shows an outside view of a multi-head formed by disposing on a single substrate many head units shown in FIG. 1. The multi-head is made by intimately bonding a glass plate 27 having a plural grooves 26 to a heating base 28 similar to the base is described in FIG. 1.

FIG. 1 is a cross-sectional view of the head unit 13 along an ink passage and FIG. 2 is a cross-sectional view taken along the line 2—2 of FIG. 1.

Figure 4:
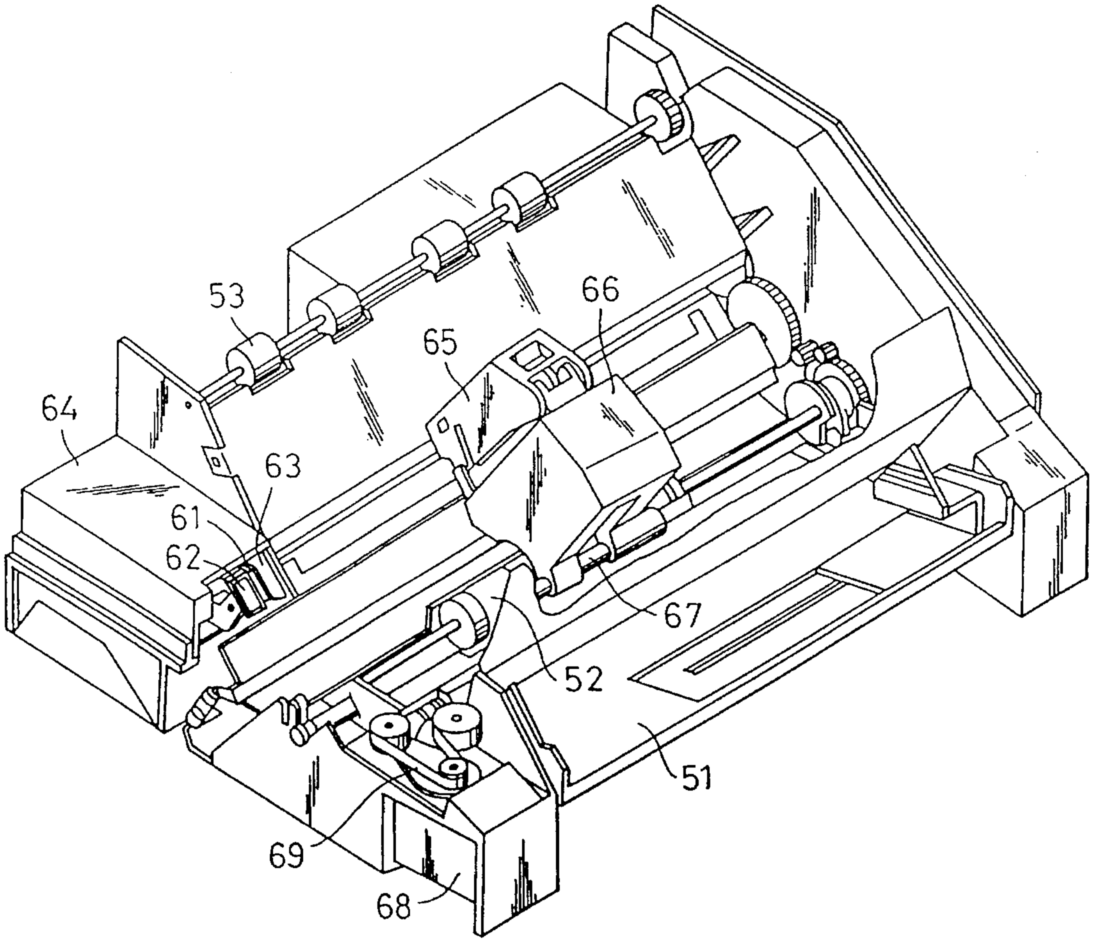
FIG. 4 is a perspective view showing an ink jet recording apparatus by way of example.

FIG. 4 shows an example of an ink jet recording apparatus to which the aforesaid head is mounted and the ink jet recording apparatus can carry out continuous recording by using a recording method of the present invention. In FIG. 4, a numeral 61 designates a blade as a wiping member and an end of the blade is held by a blade holding member and serves as a fixed end in the form of a cantilever. The blade 61 is disposed at a position adjacent to a recording region at which recording is effected by a recording head. In the case of this example, the blade 61 is held in a position such that it projects into a moving path of the recording head. Numeral 62 designates a cap which is disposed at a home position adjacent to the blade 61 and is abutted against an ejecting port surface of the recording head to carry out capping by moving in a direction transverse to the moving direction of the recording head. Numeral 63 designates an ink absorbing member disposed adjacent to the blade 61 and the ink absorbing member is held in a position such that it projects into the moving path of the recording head in the same way as the blade 61. An ejection recovery unit 64 comprises the blade 61, the cap 62 and the absorbing member 63, and water, dust and the like are removed from the ink ejecting port surface of the recording head by the blade 61 and the absorbing member 63.

Numeral 65 designates the recording head having energy generating means and carries out recording by ejecting ink to a recording sheet confronting its ejecting port surface provided with at least one ejecting port. Numeral 66 designates a carriage on which the recording head 65 is mounted for moving the recording head 65 in the moving direction. The carriage 66 is slidably engaged with a guide shaft 67 and a portion of the carriage 66 is connected to a belt 69 driven by a motor 68. With this arrangement, the carriage 66 can move along the guide shaft 67 and the recording head 65 can move in the recording region and a region adjacent to the recording region.

Numeral 51 designates a paper feed tray on which recording cut sheets are loaded, the paper feed tray being integrally arranged with a paper feed unit into which the recording cut sheets are inserted, and numeral 52 designates a paper feed roller (transportation means) driven by an unshown motor. One of the loaded recording sheets is separated by the paper feed roller which directly comes into contact with the recording surface of the recording sheet loaded on the paper feed tray and the separated recording cut sheet is supplied to a position confronting the ejecting port surface of the recording head, and as recording progresses, the recording cut sheet is discharged through a paper discharge roller 53.

In the above arrangement, when the recording head 65 returns to the home position after completion of recording, or the like, although the cap 62 of the head recovery unit 64 retracts from the movement path of the recording head 65, the blade 61 and absorbing member 63 project into the movement path. As a result, the ejecting port surface of the recording head 65 is wiped. When the cap 62 is abutted against the projecting surface of the recording head 65 in order to carry out capping, the cap 62 moves across the movement path of the recording head.

When the recording head 65 moves from the home position to a recording start position, the cap 62, the absorbing member 63 and the blade 61 are located at the same positions as where the aforesaid wiping operation is carried out. As a result, the ejecting port surface of the recording head 65 is also wiped in this movement.

Although the recording head moves to the home position when recording is completed and when ejection is to be recovered as described above, the recording head also moves to the home position adjacent to the recording region at predetermined intervals while it moves in the recording region to effect a recording operation, and the above wiping is also carried out when the recording head moves to the home position.

The present invention will be described in more detail with reference to examples. Parts and % in the following description are based on weight unless otherwise specified.

Preparation of Sheets

A recording sheet was prepared in such a manner that a coating solution having the following composition was prepared and coated on one surface of a polyethylene terephthalate film (thickness: 100 μm made by Toray) so that the coated thickness was 20 μm after the coating solution was dried at 100° C. for one minute. Further the same coating solution was coated on the other surface of the film so that a coating thickness was 20 μm after the coating solution was dried at 100° C. for one minute. The above recording sheet was cut to A4 size to obtain a laminated body of flat (without curling) A4 size recording sheets. The laminated body was enclosed in a packaging bag while the flat state of the recording sheets was maintained, the packaging bag being composed of a commercially available aluminium-deposited film product having a thickness of 100

μm which was obtained by laminating one of the two kinds of films, i.e., a polyethylene terephthalate film and a polyethylene film on one surface of an aluminium-deposited film and the other of the films on the other surface of the aluminium-deposited film. The opening of the bag was heat sealed and the recording sheets of the present invention and recording sheets for comparison were stored by enclosing such a packaging bag in a packing case composed of corrugated fiberboard (CF-101; the same packing case as that used for OHP films for Canon BJ).

The above process from drying to the completion of packaging was carried out in an atmosphere adjusted to the following conditions:

Drying conditions: (i) 20° C./30% RH, (ii) 20° C./50% RH, (iii) 20° C./70% RH, (iv) 30° C./90% RH.

| Composition of Coating Solution | |
|---|---|
| Sheet 1 | |
| Polyvinyl alcohol (PVA-205 made by Kurare) | 70 parts |
| Polyether polyester (Paogen PP-15 made Daiichi Kogyo Seiyaku) | 5 parts |
| Vinylpyrrolidone/quarternary ammonium salt-type acrylic copolymer (GAFQUAT 755 made by GAF) | 25 parts |
| Silicic acid fine powder (Cyloid 74 made by Fuji Devison) | 0.5 part |
| Water/isopropyl alcohol | 900 parts |
| Sheet 2 | |
| Polyvinyl butyral (Eslec KW-10 made by Sekisui Kagaku) | 85 parts |
| Polyether polyester (Paogen PP-15 made Daiichi Kogyo Seiyaku) | 5 parts |
| Monoarylamine/diarylamine copolymer (PAA-D11 made by Nittobo) | 10 parts |
| Silicic acid fine powder (Cyloid 74 made by Fuji Devison) | 0.5 part |
| Water/isopropyl alcohol | 900 parts |
| Sheet 3 | |
| Polyvinyl alcohol (Gosefimer Z-200 made by Nippon Gosei Kagaku) | 70 parts |
| Polyether polyester (Paogen PP-15 made Daiichi Kogyo Seiyaku) | 5 parts |
| Quaternary ammonium salt-type resin (Gosefimer C-670 made by Nippon Gosei Kagaku) | 25 parts |
| Silicic acid fine powder (Cyloid 74 made by Fuji Devison) | 0.5 part |
| Water/isopropyl alcohol | 900 parts |
| Sheet 4 | |
| No coating solution is applied (A PET film used as a base member is used as it is.). | |

EXAMPLES 1–4, COMPARATIVE EXAMPLES 1–3

A composition of recording sheets to be used, environmental conditions when the recording sheets were manufactured and physical properties of the respective recording sheets are summarized in Table 1. In Table 1, a surface electric resistance, a surface flatness, a linear transmission factor, and a surface glossiness were measured according to the methods described in the specification.

COMPARATIVE EXAMPLE 4

Recording sheets in storage were obtained by preparing them by the same method as for sheet 2 except that an aluminium-deposited packaging bag was not used.

EXAMPLES 5 AND 6

Recording sheets in storage were obtained by preparing them by the same method as for sheet 2 except that art paper and a white polyethylene terephthalate film (Merinex made by ICI) were used as base members, respectively.

The recording sheets in a packaged state of the present invention prepared as described above were left in an environment of 50° C./80% RH for 7 days, by taking actual transporting conditions under which they were to be transported into consideration, further left in an environment of 23° C./55% RH for a day or longer, and then evaluated according to the following method.

Color recording was carried out on the respective recording sheets using an ink having the following composition under the following conditions by means of the ink jet recording apparatus shown in FIG. 4 which had an ink jet recording head for ejecting the ink by causing the ink to foam by thermal energy.

Ink Composition

Dye 4 parts

Glycerol 7 parts

Thiodiglycol 10 parts

Urea 5 parts

Water 74 parts

Dye

Y: C.I. Direct Yellow #86

M: C.I. Acid Red #23

C: C.I. Direct Blue #199

Bk: C.I. Food Black #2

Recording Conditions

Ejection frequency: 4 kHz

Volume of ejected droplet: 40 pl

Recording Density: 360 dpi

Maximum amount of mono-color ink to be applied: 8 nl/mm$^2$ (8 μm)

The thus obtained color print samples were evaluated with respect to the following items.

Items to be Evaluated (1) Unpackaged Sheet Curl

The above respective recording sheets were left in a packaged state in the environment of 15° C./10% for 16 hours or longer, taken out of the packages by opening the packages in the same environment, and then each placed on a desk and left for 10 minutes in that state and a magnitude of curling of each recording sheet at that time was determined by a maximum lifted amount of the four corners of each recording sheet. Curling was evaluated by the average value of the maximum lifted amounts of 20 samples.

(2) Conveyability

The above respective recording sheets were left in a packaged state in the environments of 30° C./80% RH (H/H) and 15° C./10% (L/L) for 16 hours or longer, respectively, and taken out of the packages by opening the packages in the same environments. Thereafter, these recording sheets were evaluated under the respective environmental conditions. The recording sheets were loaded on a paper feed tray in an amount of 100 sheets under the respective conditions and recording was carried out on these recording sheets by continuously supplying them, and a result of the evaluation was shown by the number of recording sheets to which a trouble such as a paper jam, oblique traveling and the like was caused while the recording sheets were conveyed.

(3) Image Quality

An image quality was evaluated by visually observing flooding of ink, blotting of ink, thickening, thickness unevenness of solid-printed areas and the like at a distance 50 cm apart from the printed matter. As a result of the observation, samples having a very poor image quality were marked X, samples free from the above problems were marked ○, samples having a quality level between the above two levels were marked Δ, and samples having a very poor image quality due to the deterioration of an ink absorbing property and the like were marked XX.

(4) An overall evaluation was made by totally evaluating a performance of the recording sheets based on the above evaluation items.

A result of the evaluation is summarized in Table 2.

EXAMPLE 7, COMPARATIVE EXAMPLE 5

A coating solution A and a coating solution B having the compositions described below were prepared. A recording sheet was prepared in such a manner that a covering layer was formed using the coating solution A on one surface of the same polyethylene terephthalete film as that used in the preparation of the aforesaid sheets so that the covering layer had a dry film thickness of 5 μm by the same method as that used in the preparation of the aforesaid sheets and then a similar covering layer having a dry film thickness of 5 μm was formed on the other surface of the film in the same method, and then an opaque covering layer having a dry film thickness of 30 μm was formed on one of the surfaces of the covering layers using the coating solution B by the same method as described above. The recording sheet was cut and packaged by the same method as that used in the preparation of the aforesaid sheets so that recording sheets in storage for the present invention and for comparison were obtained.

| Composition of Coating Solution A | |
|---|---|
| Cation-denatured polyvinyl alcohol (PVA-C-318-2A made by Kurare) | 90 parts |
| Blocked polyisocyanate (Elastron BN-5 made by Daiichi Kogyo Seiyaku) | 10 parts |
| Water | 900 parts |
| **Composition of Coating Solution B** | |
| Urea-formalin resin particle (organic filler made by Nippon Kasei) | 100 parts |
| Polyvinyl butyral (Elex KW-10 made by Sekisui Kagaku) | 40 parts |
| Surfactant (Surflon S-101 made Sei Chemical) | 0.5 parts |
| Blocked polyisocyanate (Elastron BN-5 made by Daiichi Kogyo Seiyaku) | 4 parts |
| Mixed solvent of water/methanol/isopropyl alcohol | 856 parts |

The above process from drying to the completion of packaging was carried out in an atmosphere adjusted to the environmental conditions (ii) applied to Example 7 and in an atmosphere adjusted to the environmental conditions (iii) applied to Comparative Example 5.

An unpackaged sheet curl of the above recording sheets was measured by the aforesaid method. Although the recording sheets of Example 7 had an unpacked sheet curl of 11 mm, the recording sheets of Comparative Example 5 caused a cylindrical curl with the surface thereof on which the two covering layers were formed facing inwardly. Recording was carried out on the opaque surface (surface on which the two covering layers were formed) of the recording sheets by means of the above recording apparatus. It was confirmed that the thus obtained recorded materials were formed with a clear image which was excellent in surface glossiness and had a high density and a high resolution when they were observed from the reverse surface thereof.

TABLE 1

| | Outline of Examples and Comparative Examples | | |
|---|---|---|---|
| | (1) Sheet No. | (2) Manufacturing Environment No. | (3) Surface Electric Resistance (Ω/cm²) |
| Example 1 | 1 | (i) | $3.2 \times 10^{10}$ |
| Example 2 | 1 | (ii) | $4.3 \times 10^{10}$ |
| Example 3 | 2 | (ii) | $7.8 \times 10^{9}$ |
| Example 4 | 3 | (ii) | $5.1 \times 10^{10}$ |
| Example 5 | — | (ii) | $5.0 \times 10^{10}$ |
| Example 6 | — | (ii) | $4.6 \times 10^{10}$ |
| Comparative Example 1 | 1 | (iii) | $2.1 \times 10^{10}$ |
| Comparative Example 2 | 1 | (iv) | $9.8 \times 10^{9}$ |
| Comparative Example 3 | 4 | (ii) | $10^{15}$–$10^{16}$ |
| Comparative Example 4 | — | (ii) | $4.2 \times 10^{10}$ |

| | Outline of Examples and Comparative Examples | | |
|---|---|---|---|
| | (4) Surface Flatness (seconds) | (5) Linear Transmission Factor (%) | (6) Surface Glossiness (%) |
| Example 1 | 35 | 75 | — |
| Example 2 | 43 | 76 | — |
| Example 3 | 36 | 74 | — |
| Example 4 | 25 | 73 | — |
| Example 5 | 30 | — | 69 |
| Example 6 | 58 | — | 75 |
| Comparative Example 1 | 46 | 76 | — |
| Comparative Example 2 | 40 | 76 | — |
| Comparative Example 3 | ∞ | 84 | — |
| Comparative Example 4 | 37 | 76 | — |

TABLE 2

| | Result of Evaluation | | |
|---|---|---|---|
| | (1) Curl (mm) | (2) Conveyability (L/L) | (2) Conveyability (H/H) |
| Example 1 | 1 | 0 | 0 |
| Example 2 | 5 | 0 | 0 |
| Example 3 | 4 | 0 | 0 |
| Example 4 | 4 | 0 | 0 |
| Example 5 | 5 | 0 | 0 |
| Example 6 | 4 | 0 | 0 |
| Comparative Example 1 | 12 | 38 | 0 |
| Comparative Example 2 | 46 | 89 | 0 |
| Comparative Example 3 | 0 | 0 | 0 |
| Comparative Example 4 | 56 | 96 | 21 |

TABLE 2-continued

| | Result of Evaluation | | | | |
|---|---|---|---|---|---|
| | (1) Curl (mm) | (2) Conveyability (L/L) | (2) Conveyability (H/H) | (3) Image Quality | (4) Overall Evaluation |
| Example 1 | | | | O | O |
| Example 2 | | | | O | O |
| Example 3 | | | | O | O |
| Example 4 | | | | O | O |
| Example 5 | | | | O | O |
| Example 6 | | | | O | O |
| Comparative Example 1 | | | | O | X |
| Comparative Example 2 | | | | O | X |
| Comparative Example 3 | | | | XX | XX |
| Comparative Example 4 | | | | XX | XX |

As described above, according to the present invention, there can be provided a recording sheet having such an ideal required performance that the recording sheet has an excellent ink absorbing property, has the capability of achieving clear dots and a high optical density for forming an ultra-fine image. Further, the recording sheet itself does not cause curling, blocking, generation of static electricity due to friction, and the like, can be continuously fed for recording under any conditions from low temperature/low humidity to high temperature/high humidity, can cope with an increased recording speed and further can provide a recorded image excellent in transparency and surface glossiness.

The individual components shown in outline in the drawings are all well-known in the image recording arts and their specific construction and operation are not critical to the operation or best mode for carrying out the invention.

While the present invention has been described with respect to what is currently considered to be the preferred embodiments, it is to be understood that the invention is not limited to the disclosed embodiments. To the contrary, the invention is intended to cover various modifications and equivalent arrangements included with the spirit and scope of the appended claims. The scope of the following claims is to be accorded the broadest interpretation so as to encompass all such modifications and equivalent structures and functions.

What is claimed is:

1. A method of manufacturing and storing a recording sheet comprising the steps of:

applying a coating solution on at least one surface of a base sheet;

drying the coating to form an ink receiving layer on the sheet;

cutting the coated sheet into cut sheets having a desired size; and enclosing and sealing at least one of the cut sheets in a packaging material that is impermeable to moisture while the at least one of the cut sheets is maintained in a flat state, wherein the entirety of each of said drying step, said cutting step, and said enclosing and sealing step is effected in an atmosphere in which humidity does not exceed 50% RH.

2. A method according to claim 1, wherein at least one surface of the recording sheet has a surface electric resistance value in a range of $10^9$–$10^{11}$ $\Omega/cm^2$.

3. A method according to claim 1, wherein at least one surface of the recording sheet has a degree of surface flatness in a range of 5–250 seconds.

4. A method according to claim 1, wherein the ink receiving layer on at least one surface of the recording sheet has a thickness in a range of 8–50 μm.

5. A method according to claim 1, wherein the base sheet is transparent and a linear transmission factor of the recording sheet is 30% or higher.

6. A method according to claim 1, wherein the base sheet is opaque and at least one surface of the recording sheet has a specular glossiness at 60° of 30% or higher.

7. A method according to claim 1, wherein the base sheet is comprised of plastic and said ink receiving layer is transparent and is formed on both surfaces of the plastic base sheet.

8. A method according to claim 1, wherein the packaging material has a moisture permeability of no more than $1\times10^5$ $cm^3.cm/sec.cm^2.ppa$ at 25° C.

9. A method according to claim 1, wherein the humidity is not less than 20% RH.

10. A method according to claim 1, wherein said recording sheet has a glossy surface.

11. A method according to claim 1, wherein each of said drying step, said cutting step and said enclosing and sealing step is conducted at a temperature of 10° to 30° C.

12. A method according to claim 1, wherein the coating solution comprises a binder, a filler and an additive.

13. A method according to claim 12, wherein the binder includes at least one of starch, cationic starch, casein, gelatin, acrylic resin, maleic anhydride resin, melamine resin, urea resin, SBR, sodium alginate, polyvinyl pyrrolidone, carboxymethylcellulose, hydroxyethylcellulose, polyvinyl alcohol and polyethyleneoxide.

14. A method according to claim 12, wherein the filler includes at least one of silica, alumina, aluminum silicate, magnesium silicate, basic magnesium carbonate, talc, clay, hydrotalcite, calcium carbonate, titanium oxide, zinc oxide, polyethylene, polystyrene, and polyacrylate.

* * * * *